United States Patent [19]

Askew et al.

[11] 4,060,667
[45] Nov. 29, 1977

[54] HIGH TEMPERATURE SECONDARY BATTERIES

[75] Inventors: Barry Anthony Askew, Broadstone; Ronald Holland, Wareham; Douglas Inman; Yusuf Mohamed Faruq Marikar, both of London, all of England

[73] Assignee: National Research Development Corporation, London, England

[21] Appl. No.: 773,162

[22] Filed: Mar. 1, 1977

Related U.S. Application Data

[63] Continuation of Ser. No. 616,820, Sept. 25, 1975.

[30] Foreign Application Priority Data

Aug. 22, 1975 United Kingdom ............. 35044/75

[51] Int. Cl.$^2$ ............................................. H01M 4/36

[52] U.S. Cl. ...................................... 429/103; 429/112; 429/191; 429/199; 429/218

[58] Field of Search .............................. 429/101–104, 429/112, 191, 199, 218

[56] References Cited

U.S. PATENT DOCUMENTS

| | | | |
|---|---|---|---|
| 3,531,324 | 9/1970 | Fischer et al. | 429/103 |
| 3,663,295 | 5/1972 | Baker | 429/102 |
| 3,898,096 | 8/1975 | Heredy et al. | 429/103 |
| 3,932,195 | 1/1976 | Evans et al. | 429/104 |
| 4,013,818 | 3/1977 | Askew et al. | 429/112 |

Primary Examiner—Charles F. LeFevour
Attorney, Agent, or Firm—Cushman, Darby & Cushman

[57] ABSTRACT

The invention concerns a high temperature lithium-sulfur secondary battery, characterized in that the cathode pellet is made from titanium disulphide. An electrolyte pellet is preferably prepared from a mixture of alkali metal halides.

18 Claims, 2 Drawing Figures

HIGH TEMPERATURE SECONDARY BATTERIES

This is a continuation of application Ser. No. 616,820 filed Sept. 25, 1975.

This invention relates to secondary batteries and more particularly to high temperature/high energy density secondary batteries.

Applications of rechargeable batteries especially in the field of electric propulsion are at present restricted by the weight, cost and limited reliability of the batteries available. Considerable research is being directed towards development of high temperature batteries using alkali metals (lithium or sodium) as the negative electrode material and sulphur or a metal sulphide as the positive electrode material. One such system uses lithium or lithium-aluminum alloy coupled with iron sulphide (monosulphide or disulphide) and a molten salt electrolyte based on mixed halides of the alkali metals (typically an eutectic mixture of lithium chloride and potassium chloride). Such cells are hermetically sealed after being filled with electrolyte. Ceramic insulating materials inert to lithium are used as electrode separators and for insulation of electrical feed-throughs. The cost of these materials and the complexity of cell design are major factors determining the likely cost of the system.

Development of a low cost high energy density battery with a life of the order of 1000 cycles could revolutionise transport and thus contribute to energy conservation and reduction of atmospheric pollution.

It is an object of the present invention to simplify cell design and avoid the use of expensive insulating materials.

According to the present invention, a high temperature secondary battery comprises a stack of cells each cell having a pellet of immobilised electrolyte sandwiched between two electrode pellets, and an intercell sheet adapted to prevent direct chemical action between the electrode pellets of adjacent cells whilst maintaining electrical contact between them.

The electrolyte pellet is preferably prepared from a mixture of alkali metal halides at least one of which is a lithium salt and is immobilised by inclusion of a finely divided high melting powder which is inert to the reactants. The preferred immobilising powder is lithium fluoride.

The negative electrode pellet is preferably prepared from a mixture of a lithium alloy (eg lithium-aluminum) and the electrolyte material. Alternatively metallic lithium impregnated into a porous nickel matrix may be used.

The positive electrode pellet is preferably prepared at least partially from a metal sulphide powder. The metal sulphide powder is preferably titanium disulphide. The intercell sheet may conveniently be a sheet of stainless steel, though other metals may be used.

The stack of cells is encased in a close-fitting tube of inert electrically insulating material, such as hot-pressed lithium fluoride. One or more such stacks may be enclosed in a hermetically sealed container with appropriately insulated and sealed terminals.

Batteries according to the invention operate typically in the temperature range 375° to 450° C. The heat required to raise the battery to this temperature is supplied initially from an external source such as an external electrical supply to heating coils. Thermal insulation around the battery is used to minimise heat loss and further heat to maintain the temperature may be supplied from the external source, from the battery output or by heat generated within the battery during charge and discharge.

An embodiment of the present invention will now be described, by way of example only, with reference to the accompanying drawings, in which.

Figure 1:
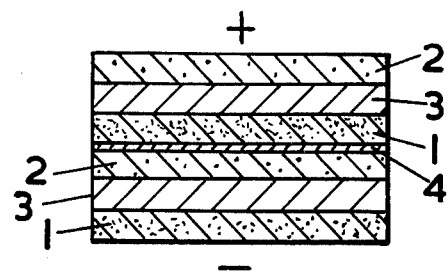
FIG. 1 illustrates diagrammatically two cells of the invention

Referring to FIG. 1 there is illustrated the general arrangement of pellets and intercell connections. Each cell has a negative electrode pellet 1, a positive electrode pellet 2 and an electrolyte pellet 3. An intercell connector 4 acts to provide electrical contact between the negative electrode pellet 1 of one cell and the positive electrode pellet 2 of the adjacent cell and to prevent chemical action between them.

Figure 2:
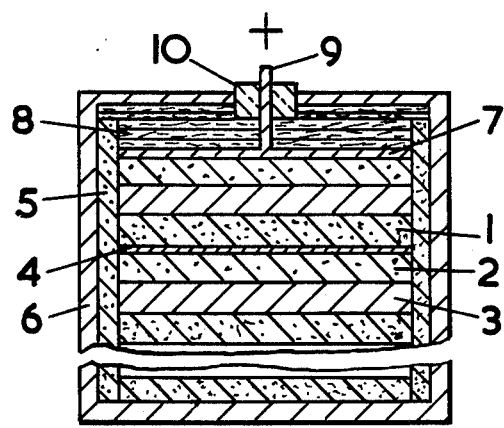
FIG. 2 illustrates diagrammatically a simple battery incorporating a stack of the cells of FIG. 1.

FIG. 2 shows the general arrangement of FIG. 1 incorporated into a simple battery.

The electrolyte pellet 3 is pressed from a mixture of 30% by weight of lithium chloride-potassium chloride eutectic and 70% lithium fluoride as immobiliser. The negative electrode pellet 1 is fabricated by pressing together lithium-aluminium alloy and 10–20% by weight of the electrolyte material. The positive electrode pellet 2 is pressed from flakes of titanium di-sulphide. A method of preparation of titanium di-sulphide is described below.

The intercell connector 4 is a disc of stainless steel sheet of the same diameter as the pellets. The stack is enclosed in a close fitting tube of lithium fluoride 5 which is in turn enclosed in a stainless steel can 6 with a welded lid. A current collector 7 at the positive end of the stack is a stainless steel sheet insulated from the lid by layers of asbestos paper 8. A positive terminal 9 passes through a metal-glass seal 10 in the welded lid. The body of the can 6 acts as a negative terminal.

An alternative form of negative electrode pellet 1 is composed of equal parts by weight of aluminium powder and lithium chloride-potassium chloride eutectic.

In order to fabricate positive electrodes, titanium di-sulphide is prepared as follows. Sponge titanium in excess of 99.9% in purity and recrystallised sulphur are mixed in the appropriate stoichiometric ratio and placed in a quartz tube. The tube is then evacuated to a vacuum of $10^{-5}$ torr and sealed off. After evacuation, the tube and contents are slowly heated to a temperature of 850° C over a period of a week, and held at that temperature for a further week. The tube is then cooled, the reaction products mixed thoroughly and the procedure repeated. After temperature cycling, the tube is broken and the flakes of titanium di-sulphide collected. Titanium di-sulphide material prepared in this fashion was found to be acceptably stoichometric by gravimetric analysis. The positive electrode pellets are produced by compaction in a steel die at about 110 Kg mm$^{-2}$, the pressure being maintained for one minute and strong, lustrous dark olive green compacts are obtained. The use of titanium di-sulphide has been found to give advantages over the use of other positive electrode materials.

Titanium di-sulphide is a stable high melting solid semi-conductor which exhibits high electronic conductivity (at 400° C, 200 ohm$^{-1}$cm$^{-1}$; compared with 10 ohm$^{-1}$cm$^{-1}$ for iron sulphide at 400° C). This property in conjunction with desirable compaction characteristics, permits its use as a solid cathode material without the aid of conductive additions such as electrolyte. Furthermore, it has been discovered, surprisingly, that titanium di-sulphide cathodes in lithium-sulphur batteries do not exhibit appreciable swelling when the battery is discharged. Also, since lithium ions are highly mobile in the titanium di-sulphide crystal lattice it is therefore not necessary (as is the case with for example iron di-sulphide cathodes hitherto preferred for this type of battery) to provide for the addition of an electrolyte when forming cathodes from this material. Titanium di-sulphide also possesses the major advantage of being stable to at least 1,000° C, whereas other metal sulphides exhibit serious decomposition vapour pressures in the operating ranges of high temperature batteries which are in excess of 350° C.

What we claim is:

1. In a high temperature lithium-sulphur secondary battery comprising a stack of cells, each cell including a pellet of electrolyte suitable for said secondary battery and sandwiched between a negative electrode pellet composed at least partially of lithium and a positive electrode pellet, and an intercell metal sheet adapted to prevent direct chemical action between the electrode pellets of adjacent cells while maintaining electrical contact between them, the improvement comprising using a positive electrode pellet composed substantially of titanium disulphide in combination with the components of said lithium-sulphur secondary battery.

2. A high temperature lithium-sulphur secondary battery according to claim 1 in which the stack of cells is encased in a close-fitting tube composed of material which is both electrically insulating at the battery operating temperature and chemically inert with respect to the materials from which the electrode and electrolyte pellets are prepared.

3. A high temperature lithium-sulphur secondary battery according to claim 1 in which the electrolyte is composed at least partially of a lithium halide.

4. A high temperature lithium-sulphur secondary battery according to claim 1 in which the electrolyte is immobilised by the addition of a finely divided, high melting point powder which is inert to the reactants.

5. A high temperature lithium-sulphur secondary battery according to claim 2 in which the tube is composed of lithium fluoride.

6. A high temperature lithium-sulphur secondary battery according to claim 2 in which the electrolyte is composed at least partially of a lithium halide.

7. A high temperature lithium-sulphur secondary battery according to claim 2 in which the electrolyte is immobilised by the addition of a finely divided, high melting point powder which is inert to the reactants.

8. A high temperature lithium-sulphur secondary battery according to claim 5 in which the electrolyte is composed at least partially of a lithium halide.

9. A high temperature lithium-sulphur secondary battery according to claim 5 in which the electrolyte is immobilised by the addition of a finely divided, high melting point powder which is inert to the reactants.

10. A high temperature lithium-sulphur secondary battery according to claim 3 in which the electrolyte is immobilised by the addition of a finely divided, high melting point powder which is inert to the reactants.

11. A high temperature lithium-sulphur secondary battery according to claim 6 in which the electrolyte is immobilised by the addition of a finely divided, high melting point powder which is inert to the reactants.

12. A high temperature lithium-sulphur secondary battery according to claim 8 in which the electrolyte is immobilised by the addition of a finely divided, high melting point powder which is inert to the reactants.

13. A high temperature lithium-sulphur secondary battery comprising a stack of cells, each cell including a pellet of electrolyte composed of a mixture of alkali metal halides at least one of which is a lithium salt, said electrolyte sandwiched between a negative electrode pellet composed at least partially of lithium and a positive electrode pellet composed substantially of titanium di-sulphide, and an intercell metal sheet adapted to prevent direct chemical action between the electrode pellets of adjacent cells while maintaining electrical contact between them.

14. A high temperature lithium-sulphur secondary battery according to claim 13 in which the stack of cells is encased in a close-fitting tube composed of material which is both electrically insulating at the battery operating temperature and chemically inert with respect to the materials from which the electrode and electrolyte pellets are prepared.

15. A high temperature lithium-sulphur secondary battery according to claim 13 in which the electrolyte is immobilized by the addition of a finely divided, high melting point powder which is inert to the reactants.

16. A high temperature lithium-sulphur secondary battery according to claim 14 in which the tube is composed of lithium fluoride.

17. A high temperature lithium-sulphur secondary battery according to claim 14 in which the electrolyte is immobilized by the addition of a finely divided, high melting point powder which is inert to the reactants.

18. A high temperature lithium-sulphur secondary battery according to claim 15 in which the electrolyte is immobilized by the addition of a finely divided, high melting point powder which is inert to the reactants.

* * * * *